Sept. 12, 1933. F. H. STROM Re. 18,951
SYNCHRONIZING ATTACHMENT FOR PHONOGRAPHS
Original Filed April 18, 1927 2 Sheets-Sheet 1
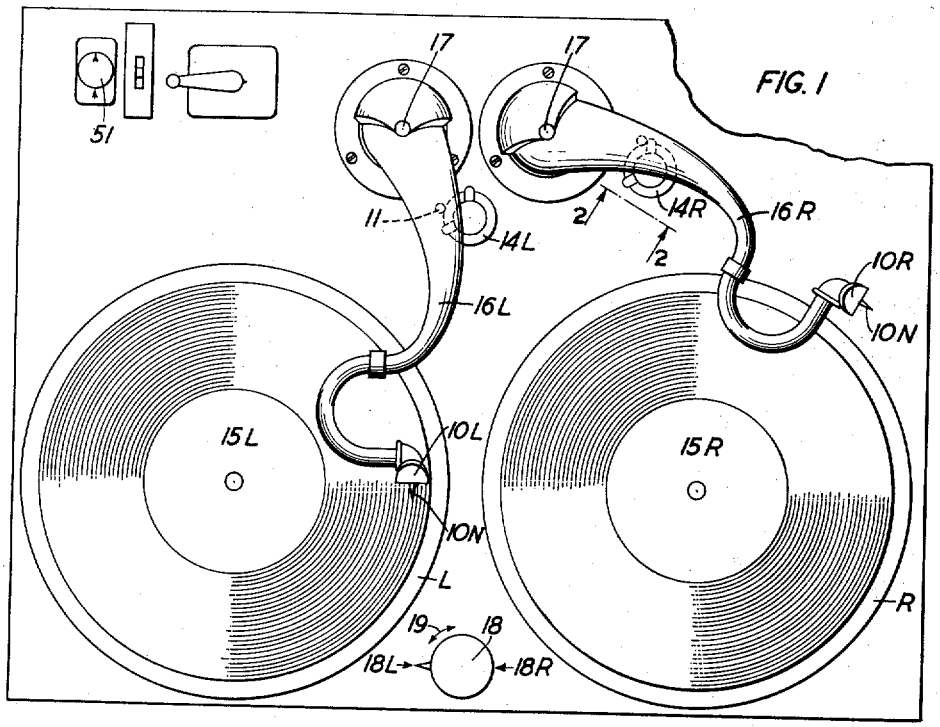
FIG. 2
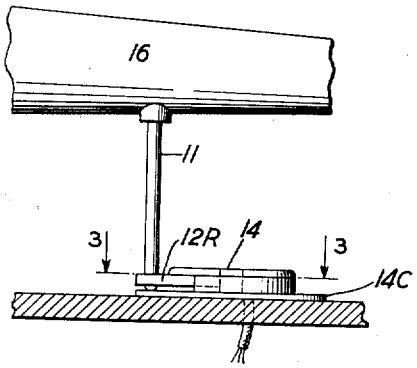
FIG. 3
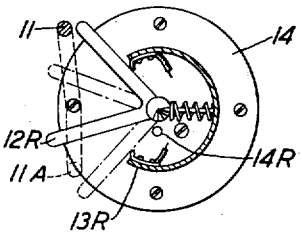
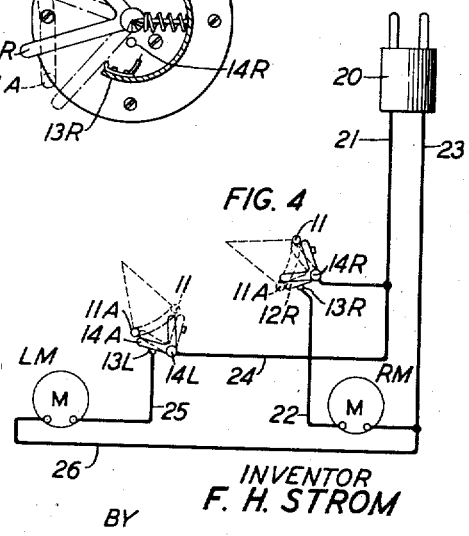
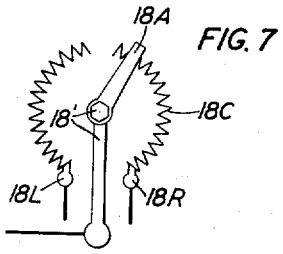
INVENTOR
F. H. STROM
BY
G. H. Heydt
ATTORNEY Sept. 12, 1933. F. H. STROM Re. 18,951

SYNCHRONIZING ATTACHMENT FOR PHONOGRAPHS

Original Filed April 18, 1927 2 Sheets-Sheet 2

INVENTOR
F. H. STROM

BY

G. H. Heydt
ATTORNEY

Reissued Sept. 12, 1933

Re. 18,951

UNITED STATES PATENT OFFICE 18,951

SYNCHRONIZING ATTACHMENT FOR PHONOGRAPHS

Frederic H. Strom, St. Paul, Minn., assignor to Western Electric Company, Incorporated, New York, N. Y., a corporation of New York Original No. 1,642,702, dated September 20, 1927, Serial No. 184,794, April 18, 1927. Application for reissue July 8, 1929. Serial No. 376,752

13 Claims. (Cl. 179—100.4)

My invention relates to the synchronizing of sound as a accompaniment to motion pictures and for theatrical productions where it is desirable to illustrate a scene or picture and synchronize with the same the accompanying sound in either musical accompaniment, voice or other sounds taking place in connection with the picture or scene to give a natural reproduction. The record of the sound may be by phonographic records or other suitable recording means adapted to furnish a record from which the sound may be picked up and synchronized with the picture or theatrical scene, and the records may be synchronized as called for by a cue sheet, chart, guide or other means which the operator follows during the time of projecting the picture or controlling the theatrical reproduction.

A primary feature of the invention resides in a device for reproducing sound wherein a series of different records of recorded sound are employed as associated with a series of pickups or electrical modulators which are adapted to translate the sound from the records into correspondingly modulated currents with fader means and a reproducer, to effectively switch or selectively pick up the recorded sound from the various records which permits the synchronizing of the sound to fit the picture being projected to give the proper "action time" between the reproduction of the recorded sound and the motion picture film or scene being enacted in a theatrical reproduction. This provides a means of accomplishing the necessary flexibility together with the fading out and fading in of such portions of the sound from the various records without any audible break between the sections or selections of the recorded sound.

I include manually operated electric synchronizing and volume control means which accomplishes the fading in and fading out by the fader means hereinafter more fully and clearly set forth.

In carrying out my invention the electric modulators or pickups are adapted to be associated with suitable scratch filter means to permit the reproduction of the recorded sound by the reproducer in the most effective manner to accomplish the desired results in the reproducing of sound as associated with moving picture films or theatrical scenes to accomplish the most natural reproduction of the scene being enacted.

These features and other objects and details will be more fully and clearly set forth in the specification and claims.

In the drawings forming part of this specification:

Figure 1 is a plan view of an electrically operated phonograph with two tone arms having electric pickups or modulators and showing one in playing position on a record, and the other in non-playing position adjacent the other record.

Figure 2 is an enlarged detail sectional elevation on the line 2—2 of Figure 1 and showing particularly the switch throwing arm of the tone arm in operative position.

Figure 3 is a detail sectional view on the line 3—3 of Figure 2, of a preferred type of switch operated by the switch throwing arm.

Figure 4 is a diagrammatic view illustrating the wiring of the motor control and switch means.

Figure 7 is a diagrammatic illustration of a modified form of the invention.

Figure 5:
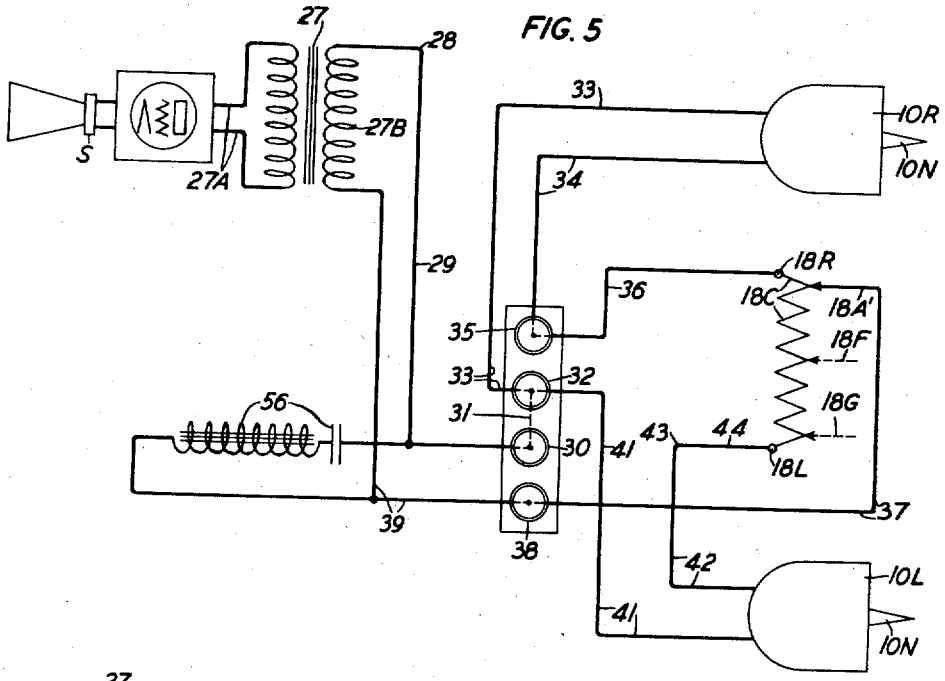
Figure 5 is a diagrammatic illustration of the wiring embodying my invention.

In the drawings I have illustrated for convenience such parts of a phonograph as are used in connection with reproduction from records having sound recorded in the same. Obviously, any suitable sound recording means may be employed in the carrying out of the principles of my invention as will be more fully hereinafter set forth.

The drawings illustrate in Figure 1 two turn tables L and R and a motor is provided for each turn table as LM and RM, indicated diagrammatically in Figure 4. A disc record 15R is positioned upon the table R and a record 15L is positioned upon the record table L.

A plurality of electric pickups or current modulators 10 are illustrated together with the reproducing needle 10N, and the pickups are supported by suitable horizontally oscillatable tone arms 16R and 16L of any suitable construction which are pivotally supported at 17 so as to permit the pickup to move along on the record in translating the sound from the records by the modulators or pickups 10. My device is adapted to provide the music or sound for an entire photoplay or theatrical scene, the sound being recorded in a plurality of records such as the disc type or any other suitable sound recording means from which the sound variations can be translated electrically and controlled by the operator with my device, so that they may be exchanged or selected in the operation of my device to provide a continuous play, such as in a photoplay picture with the sound accompaniment.

In operating my synchronizing means for records in connection with scenes or photoplays, the blending in and out of the music or sound is one of the primary objects of the invention and this may be accomplished by placing the pickup or modulator 10R in place on the outer edge of the record 15R, the switch 14R closing the circuit for the motor RM which drives the turn table R. This record 15R may be in full operation with the pickup or modulator 10R operating on the same without reproduction of the music or sound from the record until the synchronizing control 18 is turned from position 18L as indicated by the arrow 19 to position 18R. The control 18 may be moved around slowly so that the music or sound on the record 15L fades away while the music or sound from the record 15R comes in gradually without a break in the reproduction of the music or sound, thus fading out and in the sound from the respective records 15L and 15R without audible break.

The switch 14 is provided with an arm 12R which is moved by the switch throwing arm 11 to the position 11A. This closes the circuit between 14R and 13R and the current being fed in from the wall plug 20 through the wires 21 and 22, through the motor RM and through the wire 23 back to the plug 20 which immediately starts the motor RM. The motors RM and LM are operated from the wall plug 20 and through the connecting wires 21 and 23 as illustrated in Figure 4. The switch 14 has an arm 12R which is moved by the switch throwing arm 11 to position 11A and this closes the circuit to start the motor RM.

In the position illustrated in Figure 1 the tone arm 16L is supporting the pickup or modulator 10L so that the needle 10N will contact with the record 15L in a manner to reproduce the same as will be more fully hereinafter set forth. In this position the switch 14L has closed the circuit from the plug 20 through the wires 21 and 24, through the switch 14L, through the arm 14A, to the contact 13L, and through the wire 25, to the motor LM, and then through wires 26 and 23 back to the wall plug 20.

The switch 14 is provided with a cushion 14C which tends to muffle any metallic sound as the switch is thrown by the switch operating arm 11.

My synchronizing means and device includes a multiplicity of electric pickups or current modulators which translate the sound from the records, selectively, and obviously the records may be of any suitable nature wherein the sound is recorded in a manner so that it can be picked up by electrical pickup means. In the operation of the pickup or modulator 10R the circuit is completed from the pickup 10R through the wire 33 to the terminal 32, through the lead wire 31, to the terminal 30, through the wire 29 to the terminal 28 and to the primary circuit 27B back through the lead wire 39 and through the synchronizing control 18A, which cooperates with the resistance 18C to form the fader of my device, through the terminal 18R and the lead wire 36 to the terminal 35 and back to the pickup 10R through the wire 34. This completes the circuit from the current modulator or pickup 10R and the sound from the record picked up by the modulator or pickup 10R is transmitted to a loud speaker or power amplifier input S, through the secondary circuit 27A of the audio transformer 27. In this circuit I provide a scratch filter 56 shunted across the leads 29 and 39 clarifying the reproduction to the speaker or power amplifier input S.

When it is desired to fade out the current modulator or pickup 10R and fade in the pickup 10L from records being translated, the resistance control 18A is moved from the position 18A′ as indicated by 18F. This increases the resistance to the modulator or pickup 10R and decreases it in relation to the pickup 10L so that when the resistance control is moved to the position 18G the resistance 18C is virtually cut out in relation to the pickup 10L, and a circuit to the loud speaker S is formed. This circuit follows from the pickup 10L through the wire 42 to the terminal 43, through the wire 44, through the terminal 18L, through the control or fader 18A, (at the position 18G) through the wire 37 to the terminal 38, through the wire 39 to the audio transformer 27, to the terminal 28, through the wire 29, to the terminal 30, through the lead 31, to the terminal 32, and through the wire 41 to the pickup 10L. This operation fades out the pickup 10R and fades in the pickup 10L without any audible break and thus permits the selection of sound from a multiplicity of records with a smooth uninterrupted production as is required in the synchronizing of sound with motion picture films and theatrical productions.

Figure 6:
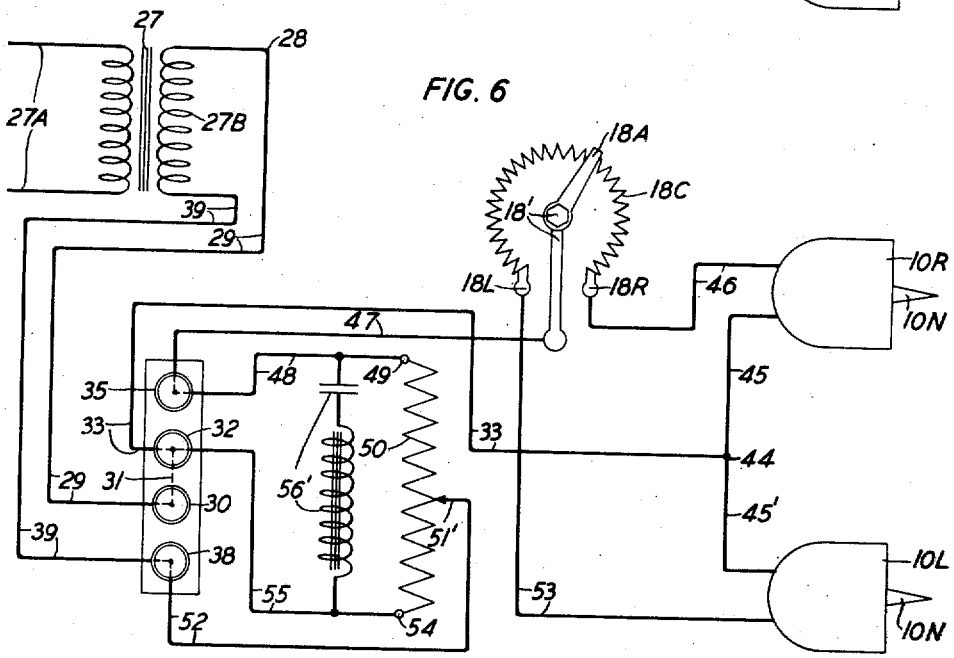
Figure 6 is a diagrammatic illustration of the wiring embodying my invention wherein the synchronizing means is illustrated with the fader and volume control.

In the modified form illustrated in Figure 6 the pickups 10R and 10L are connected through the fader made up of the control switch 18A and the resistance 18C. In this form when it is desired to translate sound by the electric pickup or modulator 10R the current will be directed from the pickup 10R through the wire 46 to the terminal 18R, through the resistance 18C, through the arm 18A, the terminal 18′ through the wire 47 to the terminal 35, through the wire 48 to the terminal 49, through the resistance 50 to the control 51, through the wire 52 to the terminal 38, through the wire 39 to the audio transformer 27 to the power amplifier input S, not illustrated in this figure, through the terminal 28, then through the wire 29 to the terminal 30, through the lead wire 31 to the terminal 32 and through the wire 33 to the common terminal 44 and through the wire 45 to the pickup 10R. This completes the circuit in the operation of the pickup 10R in this form of my device and obviously the operation of the control arm 19A in the fader made up by the resistance 18C and the arm 18A controls the volume from the pickup 10R so as to increase the same by reducing the resistance in the circuit.

The fader means formed by the control switch arm 18A and the resistance 18C in the form of my device in Figure 6 may be operated to fade in the pickup 10L by reducing the resistance between the terminal 18′ and 18L. In the operation of the pickup 18L the circuit will follow through the lead wire 45 to the common terminal 44 through the wire 33, to the terminal 32, through the lead wire 31, to the terminal 30, through the wire 29 to the terminal 28, through the audio transformer 27 and through the wire 39 to the terminal 38, then through the wire 52 and through the control 51′, through the resistance 50 to the terminal 49, through the wire 48 to the terminal 35, through the wire 47 to the fader which carries the current through the switch arm 18A and terminal 18L, thence through the wire 53 to the pickup 10L, thus completing the circuit for the pickup 10L.

In this form of my synchronizing control for selectively picking up sound from records electrically to transmit the same to a power speaker F I also provide a scratch filter 56′ which is shunted across in the circuits of the pickups 10R and 10L.

In the form of my device illustrated in the circuits in Figure 6 the volume control made up by the resistance 50 and the control arm 51′ may be operated in a manner so that in case one or the other of the electric pickups 10R or 10L is to be tuned out without tuning the other in by the fader, made up of the resistance 18C and the control arm 18A, it is only necessary to operate the volume control 51′ in the desired direction so as to permit the fader to act as a switch and switch from the terminal 18R to 18L or vice versa, whereas the volume control 51 is operated to prevent any audible break while switching from one pickup to the other. This provides a means of selectively picking up the sound from one record or another and also the controlling of the volume in such a manner as to give a very desirable reproduction as associated with moving picture films where it is essential that the sound be synchronized to give the most natural reproduction.

In the form of my device illustrated in Fig. 7 the fader is illustrated as having an open section in the resistance 18C between the terminals 18L and 18R. It will be noted that this fader may be substituted for the fader shown in Fig. 6 without change in the remainder of the circuit. The operation of the system is identical to that previously described except that in this case when the volume from one pick-up is being reduced there will be no simultaneous and overlapping increase in volume from the other pick-up. Thus, if the arm 18A is in contact with terminal 18L maximum volume from the lower pick-up is attained. As the arm 18A is moved in a clockwise direction this volume is reduced and when the arm 13A is in position over the open section of the resistance there will be no sound from either pick-up. Further advance of the arm 18A will render the upper pick-up effective first with minimum volume which may be increased to a maximum by rotation of the arm into contact with terminal 18A. In this way a substantially similar operation of the system is possible and unpleasant effects are avoided in cases where the end of one record and the beginning of the next record are widely dissimilar and might otherwise produce discordant effects.

I claim:

1. An electric record playing machine having, two record turntables, two oscillatable tone arms, an electric pickup on each tone arm and suitable electric sound transmitting means to a tone chamber; an electric motor for each turntable, circuit closing and opening means operated by the oscillating movement of the tone arms for starting and stopping the corresponding motors; an electric circuit operatively connecting both pickups, means in said circuit for controlling current selectively through said pickups and simultaneously increasing current through one while decreasing current through the other to electrically reproduce sound from either record as desired.

2. An electric record playing machine having, two record turntables, two oscillatable tone arms, an electric pickup on each tone arm and suitable electric sound transmitting means to a tone chamber; an electric motor for each turntable, circuit closing and opening means operated by the oscillating movement of the tone arms for starting and stopping the corresponding motors; an electric circuit operatively connecting both pickups, means in said circuit for controlling current selectively through said pickups and simultaneously increasing current through one while decreasing current through the other to electrically reproduce sound from either record as desired, and volume control means incorporated in said pickup circuits, comprising a resistance coil and a rotary control engaging said resistance and arranged to vary the current to the sound reproducing means.

3. An electric record playing machine having, two record turntables, two oscillatable tone arms, an electric pickup on each tone arm and suitable electric sound transmitting means to a tone chamber; an electric motor for each turntable, circuit closing and opening means operated by the oscillating movement of the tone arms for starting and stopping the corresponding motors; an electric circuit operatively connecting both pickups, means in said circuit for controlling current selectively through said pickups, and simultaneously increasing current through one while decreasing current through the other to electrically reproduce sound from either record as desired, in which said motor starting and stopping means comprises for each tone arm, a finger fixed on the tone arm, an oscillatable switch arm arranged in the path of the movement of the said finger, one arm of said switch adapted to be engaged and swung by said finger to a fixed circuit closing contact to start the motor, the other arm of said switch arranged to be engaged and moved by said finger when the tone arm is swung in the opposite direction, to open said circuit.

4. An electric record playing machine having, two record turntables, two oscillatable tone arms, an electric pickup on each tone arm and suitable electric sound transmitting means to a tone chamber; an electric motor for each turntable, circuit closing and opening means operated by the oscillating movement of the tone arms for starting and stopping the corresponding motors; an electric circuit operatively connecting both pickups, means in said circuit for controlling current selectively through said pickup and simultaneously increasing current through one while decreasing current through the other to electrically reproduce sound from either record as desired, and a scratch filter incorporated in said circuit.

5. An electric record playing machine having, two record turntables, two oscillatable tone arms, an electric pickup on each tone arm and suitable electric sound transmitting means to a tone chamber; an electric motor for each turntable, circuit closing and opening means operated by the oscillating movement of the tone arms for starting and stopping the corresponding motors; an electric circuit operatively connecting both pickups, means in said circuit for controlling current selectively through said pickup and simultaneously increasing current through one while decreasing current through the other to electrically reproduce sound from either record as desired, in which said means for controlling the current from both pickups comprises a rheostat with one terminal connected with one pickup and the other terminal connected to the other pickup, alternating current transmitting means from said pickups, a synchronizing control arm operable on said rheostat between its terminal to selectively increase or decrease the current from the pickups, circuit wires from said control arm and a resistance coil in said latter circuit comprising a volume control.

6. In an electric record playing machine having, two record turntables, a pair of electric pickups, one each on a tone arm and operable on a record, a motor for each turntable, means fixed on each tone arm for closing the circuit to the motor of its turntable when the pickup is moved to contacting position, said electric circuit closing means being non-contacting with relation to each other when the pickup is operating over the tone producing area of a record.

7. In combination, a plurality of electric current pickups for translating recorded sound variations into corresponding electric current variations, amplifier and reproducer means associated with said electric current pickups, and fader means associated with said electric current pickups and reproducers, for selection of sound from any of a series of records.

8. An electric reproducing machine for recorded sound variations including, electrical means for translating recorded sound variations into corresponding electric current variations, a second electrical translating means, and single fading means associated with said first and second electrical translating means to fade out electric current variations coming from said first electrical translating means and fade in electric current variations from said second electrical translating means.

9. An electric reproducing machine for recorded sound, a series of sound records, a series of current electric pickups for translating the recorded sound from said records into corresponding electric current variations having a common circuit, amplifier and reproducer means associated with said pickups, scratch filter means associated with said pickup and fader means associated with said common circuit so as to permit the fading in and fading out of the electric current variations from said pickups to said reproducer.

10. An electric reproducing machine for recorded sound including, a series of sound records, a series of electric current modulators, amplifier and reproducer means associated with said electric current modulators, scratch filter means associated with said electric current modulators, and single fader means for fading out the current variations from some of said modulators and fading in the current from other of said modulators.

11. The combination with a pair of pickup devices for delivering audio-frequency electrical variations, a receiver responsive to audio-frequency electrical variations, and electrical circuits between the pickup devices and receiver, of an electrical switch associated with said circuits and comprising, in a unitary structure, means for gradually decreasing the effect on the receiver of one of said pick-up devices and gradually increasing the effect on the receiver of the other pick-up device.

12. The combination with a pair of pick-up devices for delivering audio-frequency electrical variations, a receiver responsive to audio-frequency electrical variations, and output circuits for the pick-up devices, of means common to said output circuits for gradually decreasing the effect on the receiver of one of said pick-up devices and gradually increasing the effect on the receiver of the other pick-up device.

13. The combination with a pair of pick-up devices for translating records of sound variations into corresponding electrical variations, a sound radiating device responsive to audio-frequency electrical variations, electrical circuits connecting said pick-up devices and sound radiating device, and an electrical switch for transferring the effective connection to the input of the sound radiating device from the output of the one pick-up device to the output of the other pick-up device, of means under the control of said switch for effecting, in the course of the switching operation, a gradual change in the circuit impedance between one of said pick-up devices and the sound radiating device and then effecting a gradual change in the circuit impedance between the other of said pick-up devices and said sound radiating device.

FREDERIC H. STROM.